United States Patent [19]
Morrell et al.

[11] Patent Number: 5,452,790
[45] Date of Patent: Sep. 26, 1995

[54] MOUNTING SYSTEM FOR A ROLLER TABLE

[75] Inventors: Carl J. Morrell, Middletown; Ernest W. Pendergrass, Hamilton; Vincent E. Taylor, Middletown, all of Ohio

[73] Assignee: AK Steel Corporation, Middletown, Ohio

[21] Appl. No.: 258,801

[22] Filed: Jun. 10, 1994

[51] Int. Cl.$^6$ .................................................. B65G 13/12
[52] U.S. Cl. ........................................ 198/782; 193/35 SS
[58] Field of Search ............................ 198/782, 788; 193/35 SS

[56] References Cited

U.S. PATENT DOCUMENTS

| | | | |
|---|---|---|---|
| 1,728,538 | 9/1929 | Gentil et al. | 198/782 |
| 1,865,891 | 7/1932 | Drake | 198/782 |
| 2,608,286 | 8/1952 | Henschker | 198/782 |
| 3,207,289 | 9/1965 | Smith | 198/782 |
| 3,511,489 | 5/1970 | Field | 198/782 |
| 3,980,170 | 9/1976 | Jakes et al. | 198/782 |
| 3,990,570 | 11/1976 | Mercier et al. | 198/782 |
| 4,930,612 | 6/1990 | Thorndyke | 193/35 SS |

*Primary Examiner*—Joseph E. Valenza
*Attorney, Agent, or Firm*—R. J. Bunyard; L. A. Fillnow; R. H. Johnson

[57] ABSTRACT

This invention relates to a roller mounting system for use in a table (10) for conveying articles of manufacture through a production line. The mounting system includes a split frame for supporting an electric motor (26) for powering a roller (22) defining a generally horizontal path of travel along an upper surface of the roller table. The frame includes a fixed lower portion (30) connected to a structural member (34) of the roller table and an upper portion (32) adapted for longitudinal and vertical movement relative to the lower portion. Lower portion (30) includes a movable block (72) slidably mounted to a lower mounting plate (42) for cooperating with a threaded operator (74) mounted in a threaded bore in a block (70) for shifting the upper portion between an operating and a retracted position, a pair of spaced runners (44) and a block (62) having a stop surface (92). Upper portion (32) includes a block (56) on a chamfered end of the frame, a block (58) on the motor end of the frame for locking the upper portion to the lower portion when the upper portion is in the operating position and a pair of spaced runners (40) for being supported by lower runners (44). Each upper runner (40) includes a riser (46) and each lower runner (44) includes a riser (48). When block (72) is operated to shift upper portion (32) sufficiently to clear the risers, a defective or inoperative roller can be moved from the operating position to a retracted position so that the roller can not damage the articles.

19 Claims, 6 Drawing Sheets

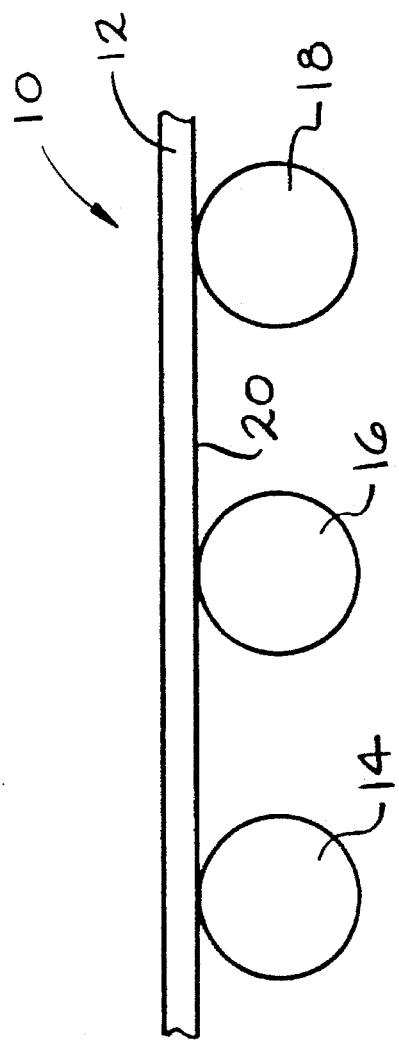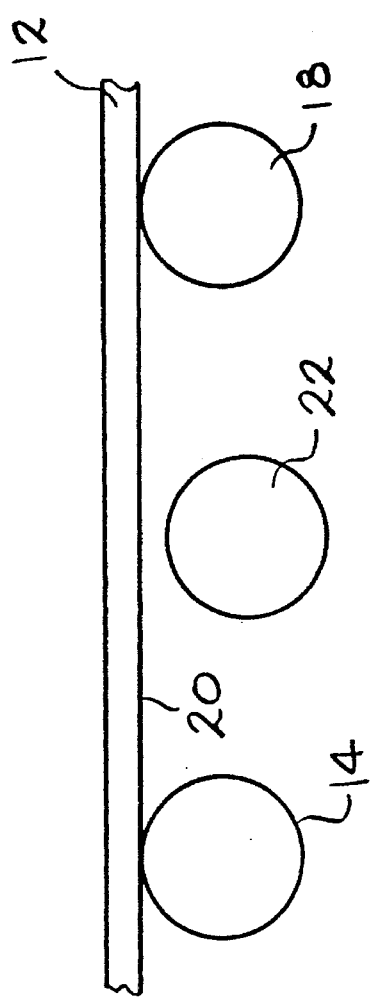

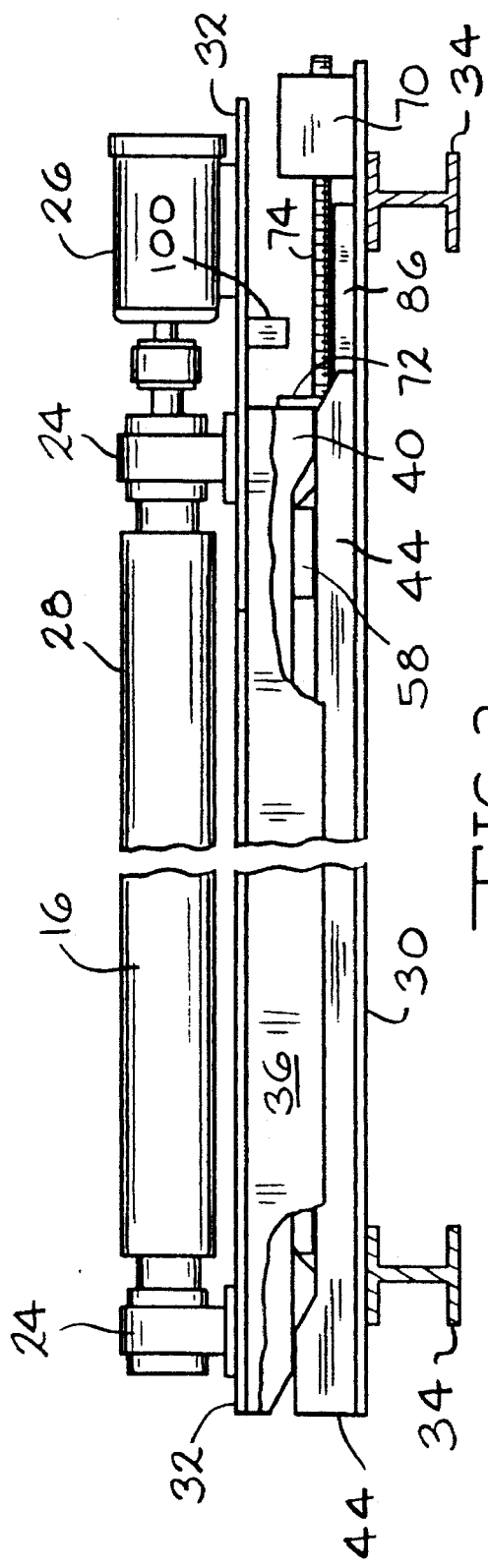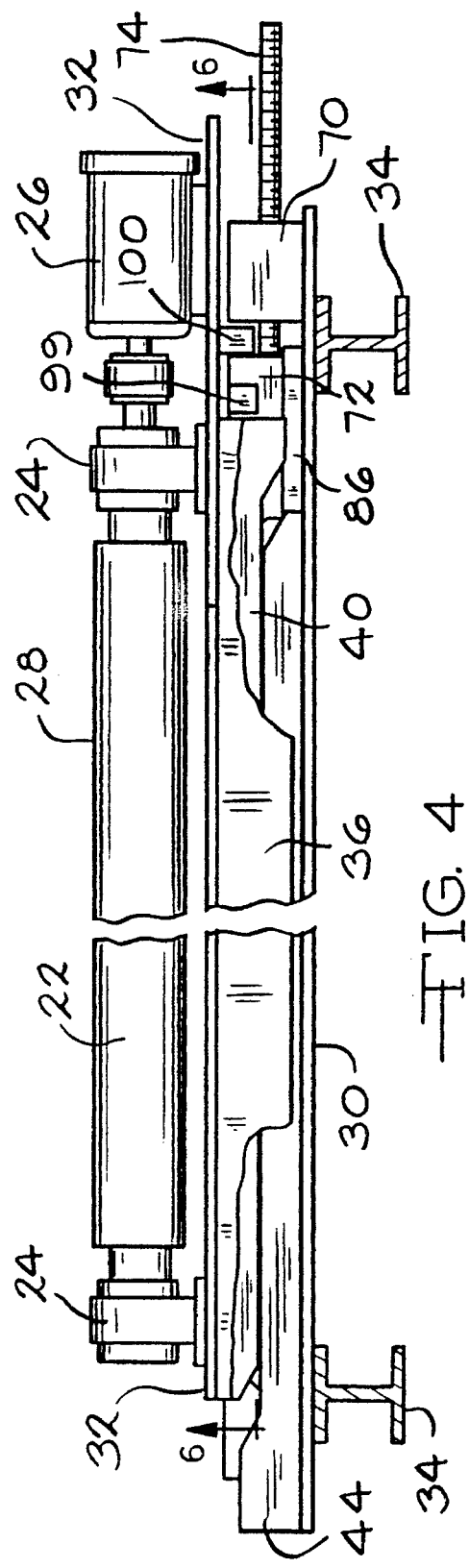
FIG. 3
FIG. 4

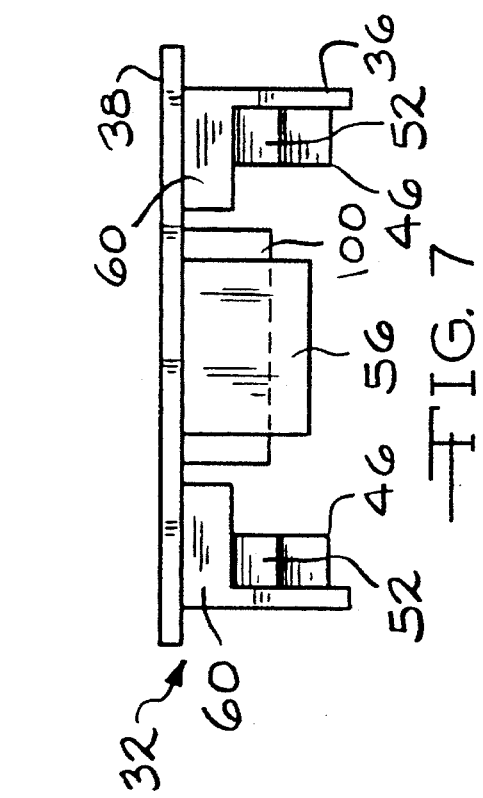
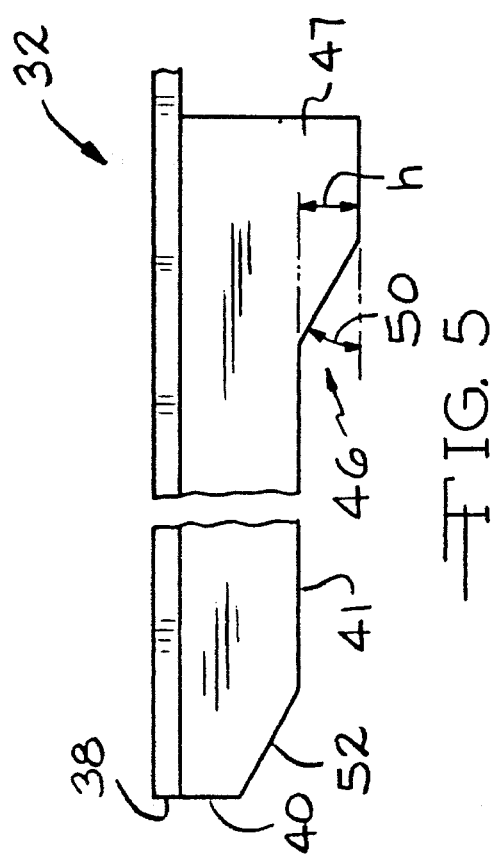
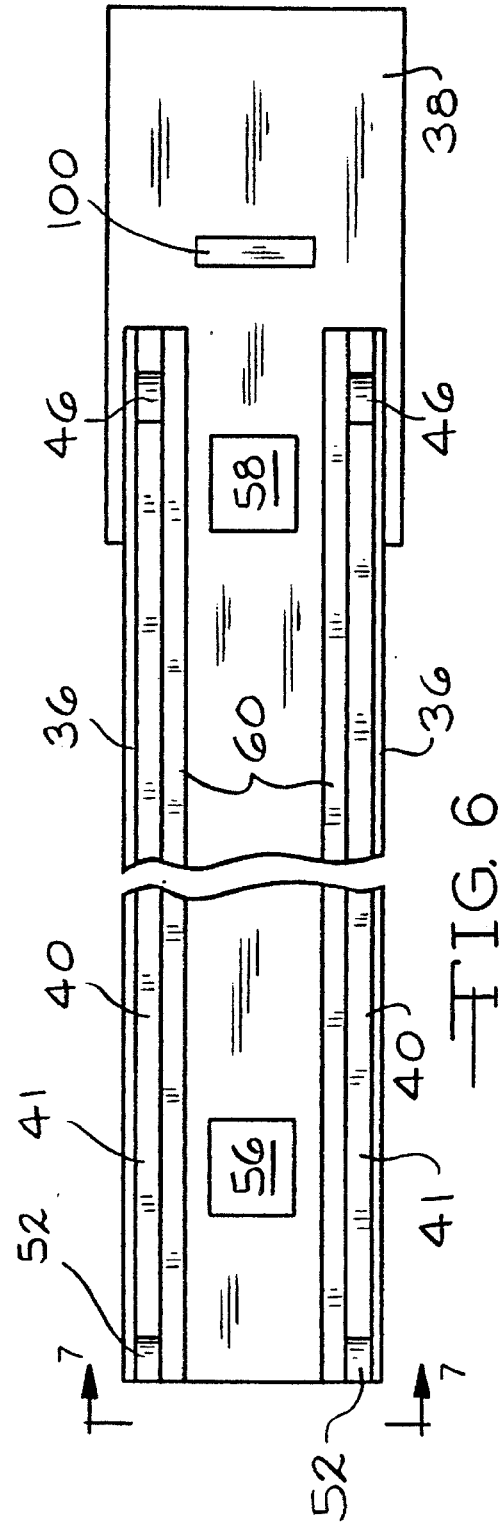

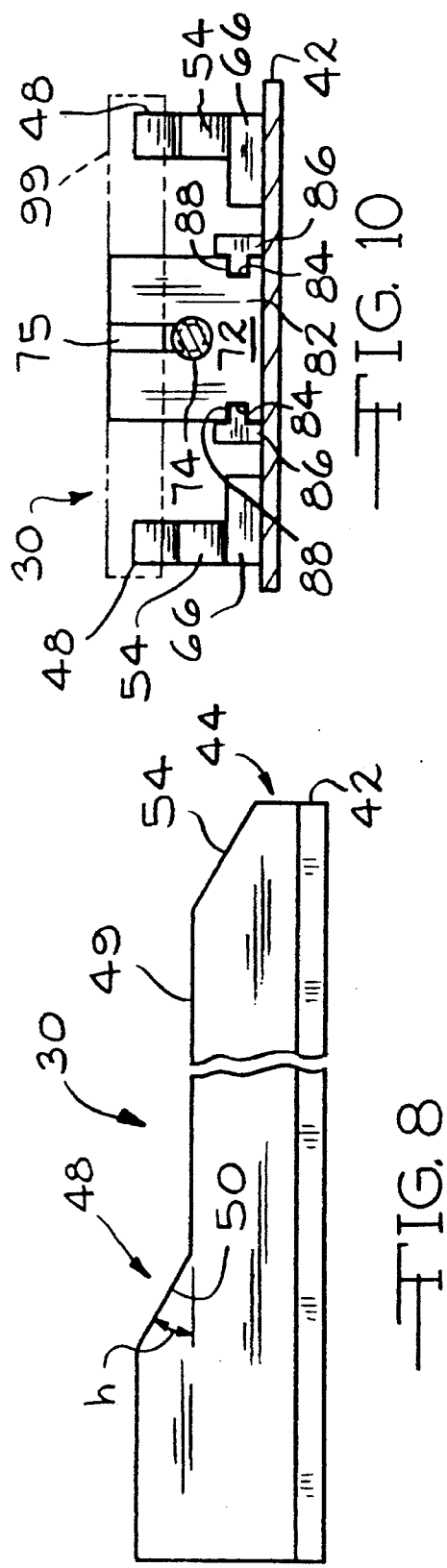
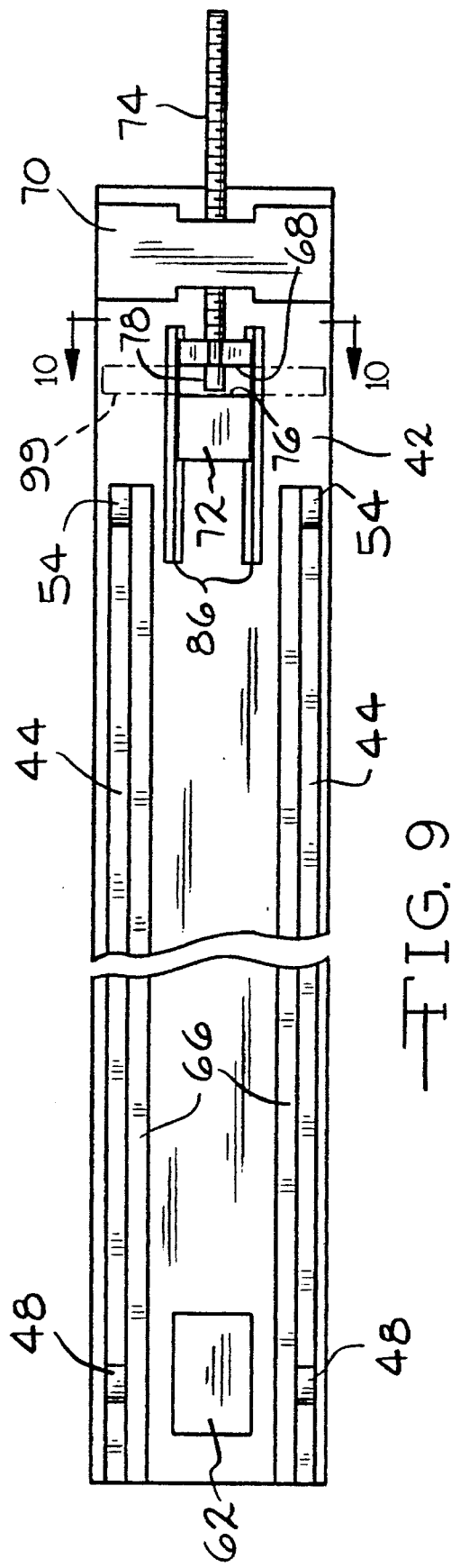

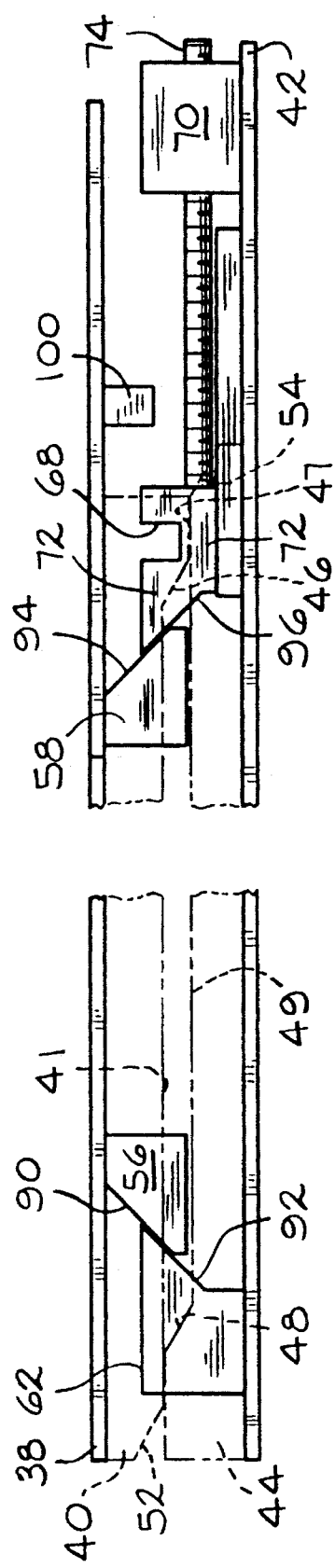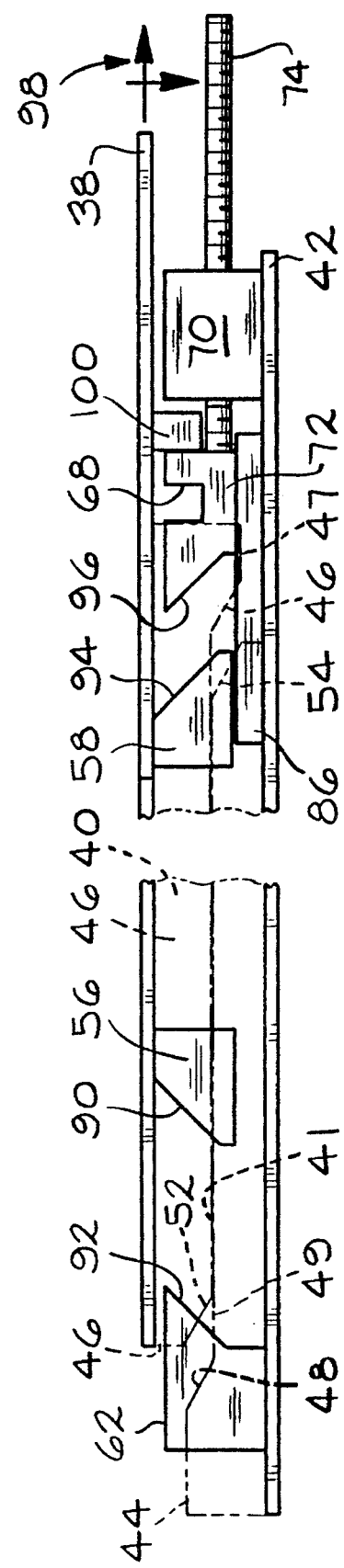

MOUNTING SYSTEM FOR A ROLLER TABLE

BACKGROUND OF THE INVENTION

This invention relates to approach tables for conveying articles of manufacture during their production wherein defective or inoperative table rollers can be taken out of service for repair or replacement without interruption of a production line. More particularly, the invention includes a roller mounting system having a split frame wherein part of the frame can move relative to the remainder of the frame to displace the roller from an operating position to an inactive or retracted position.

Approach tables are used to convey metal articles of manufacture such as slabs, blooms or billets from a caster to roughing or reducing mills wherein the articles are reduced in thickness and/or width. Approach tables also are used to convey articles to further processing equipment such as shears, finishing mills, strip coilers, and the like. An approach table includes a series of rollers for supporting an article as it is moved between various processing stations. Many of these rollers, such as rollers in a high speed runout table after a strip finishing mill, are driven by individual variable speed AC or DC electric motors with the speed of the motor being synchronized to the speed of the strip exiting from the last stand of the finishing mill.

Whenever an outer surface of a roller becomes defective or the roller becomes inoperative, the roller needs to be removed from the approach table for repair. For example, the roller may become inoperative because it has become broken, a roller bearing becomes locked, an electrical failure has occurred, a drive motor has failed, and the like. This defective equipment can not be removed, however, until a scheduled downturn occurs in the rolling mill because the frame for mounting each roller is rigidly connected to the roller table. In the meantime while the defective approach or roller table continues to be operated, a damaged outer surface of a defective roller or a non-rotating roller may cause surface defects to the article being conveyed along the production line.

Additional disadvantages of using rigidly mounted rollers in an approach table are the entire unit, including the roller support, must be removed during repair or replacement. This equipment removal not only is time consuming but also ties up maintenance personnel and equipment, e.g., an overhead crane, that otherwise could be used for maintenance elsewhere during the downturn.

Accordingly, there is a need to displace or remove a defective or inoperative roller from a roller table during the production of articles of manufacture without interruption of a production line.

BRIEF SUMMARY OF THE INVENTION

This invention relates to a roller mounting system in a roller table for conveying articles through a production line.

An object of the invention is to prevent a defective or inoperative table roller from damaging the articles during their manufacture. Another object of the invention is being able to repair or replace a defective or inoperative table roller without interrupting the production line.

The mounting system of the invention includes a split frame for supporting a roller defining a generally horizontal path of travel along an upper surface of a roller table. The frame includes a lower fixed portion, an upper portion adapted for longitudinal and vertical movement relative to the lower portion and means for shifting the upper portion between an operating position and a retracted position.

Another feature of the invention is for the aforesaid frame to include means for locking the upper portion to the lower portion when the upper portion is in the operating position.

Another feature of the invention is for the aforesaid lower portion to include a pair of spaced runners extending parallel to the axis of the roller for supporting the upper portion.

Another feature of the invention is for the aforesaid runners to include a riser for vertically shifting the upper portion.

Another feature of the invention is for each of the aforesaid frame portions to include a mounting plate, a movable block coupled to the top of the lower mounting plate for shifting the upper portion and a stop surface on the top of the lower mounting plate for locking the upper portion.

An advantage of the invention includes eliminating damage to articles of manufacture when the surface of a roller becomes defective or the roller becomes inoperative by displacing the roller from the normal operating position on the roller table to an inactive position without disrupting operation of the production line. An additional advantage includes being able to remove the roller from service but leave it temporarily mounted onto the roller table in a storage position. This permits the roller to be repaired at a later time. In the case of a high speed runout table in a continuous hot strip mill, the roller left in the storage position permits feeding of metal strip to a coiler.

The above and other objects, features and advantages of the invention will become apparent upon consideration of the detailed description and appended drawings.

BRIEF DESCRIPTION OF THE DRAWINGS

FIG. 1 is a schematic elevation view of a processing line incorporating a roller mounting system of the invention with the rollers in an operating position, FIG. 2 is similar to FIG. 1 illustrating a roller mounting system of the invention in a retracted position, FIG. 3 is an enlarged elevation view of a roller mounting system of FIG. 1, FIG. 4 is an elevation view illustrating the retracted roller of FIG. 2, FIG. 5 is an elevation view of the upper portion of the split mounting frame of the invention, FIG. 6 is a bottom view of the mounting frame of FIG. 5, FIG. 7 is an end view along line 7—7 of FIG. 6, FIG. 8 is an elevation view of the lower portion of the split mounting frame of the invention, FIG. 9 is plan view of the lower portion of the mounting frame of FIG. 8 illustrating a locking mechanism, FIG. 10 is an end view along line 10—10 of FIG. 9, FIG. 11 is an enlarged elevation view similar to FIG. 3 illustrating the split mounting frame in the operating position with the upper portion of the frame locked to the lower portion of the frame, and FIG. 12 is an enlarged elevation view similar to FIG. 4 illustrating the upper portion of the frame being unlocked from the lower portion of the frame and the upper portion of the split mounting frame being shifted to the retracted position.

DETAILED DESCRIPTION OF THE PREFERRED EMBODIMENT

Figure 13:
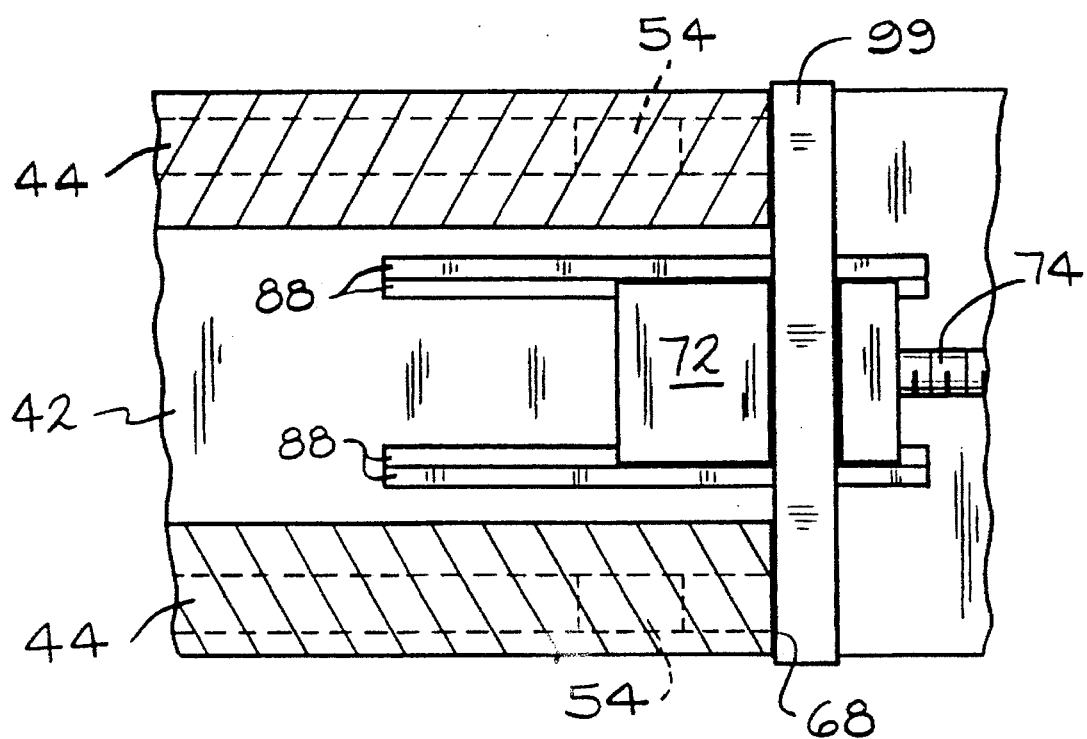
FIG. 13 is an enlarged view of the locking mechanism of FIG. 9.

This invention relates to a roller mounting system for a table for conveying articles of manufacture during their production. The mounting system includes a split frame having a lower fixed portion, an upper portion adapted for longitudinal and vertical movement relative to lower portion and means for shifting the upper portion between an operating position and a retracted position. This movable mounting system allows defective or inoperative rollers to be taken out of service for repair or replacement without interruption of the processing line. The invention can be used in manufacturing wherein the articles may be elongated steel or non-ferrous metal formed by casting of molten metal into slabs, blooms or billets and subsequently processed into plates, strips, tubes, bars and the like. The mounting system may be used for roller tables used for conveying non-metal articles as well. By roller table is meant any type of conveyer having driven or non-driven rollers for transferring the articles along a materials flow path from one work station to another such as from a continuous caster through the final finishing mill of a rolling mill. The invention has particularly utility for electric powered rollers in a high speed runout table following the last finishing stand of a continuous hot strip mill for conveying steel strip to a coiler.

FIG. 1 illustrates a schematic elevation view of a roller table 10 of a processing line incorporating a roller mounting system of the invention. Table 10 is used for conveying an article 12 such as an elongated steel slab or strip. The roller table includes one or more rollers such as rollers 14, 16 and 18 for contacting and thereby supporting an underside 20 of the article. That is, rollers 14, 16 and 18 are in their operating position. The upper outside surface of the rollers generally define a horizontal path of travel or passline for the underside of the article along the upper surface of the roller table.

FIG. 2 is similar to FIG. 1 except a roller 22 is illustrated in a retracted or non-operating position with the outer surface of roller not supporting article 12.

FIG. 3 is enlarged elevation view of roller 16 in FIG. 1 and FIG. 4 is a similar view of roller 22 in FIG. 2. FIG. 3 illustrates the roller in an active or operating position wherein the outer surface of the roller can contact the underside of an article being conveyed alone the roller table and FIG. 4 illustrates the roller in an inactive or retracted position wherein the roller can not contact the article. Rollers 16 and 22 are rotatably supported by a pair of spaced roller bearings 24 and may be powered by an electric motor 26. If the rollers are powered by a motor, the speed of the motor generally will be synchronized to a predetermined speed of the article. The rollers have an outer surface 28 for contacting underside 20 of article 12. The mounting system of the invention includes a split frame having a lower fixed portion 30 for being connected to structural beams 34 of the bed frame, an upper portion 32 adapted for longitudinal and vertical movement relative to lower portion 30 and means for shifting the upper portion between an operating position and a retracted position. Preferably, the mounting system also includes means for locking the upper portion to the lower portion when the upper portion is in the operating position and a side shield 36 connected to each side of upper portion 32. In a roller table subject to excessive vibration, it is desirable to lock the upper portion of the split frame when in the operating position to prevent the upper portion from shifting to the retracted position. By adapted for longitudinal and vertical movement is meant upper portion 32 is mounted in a manner permitting both lengthwise and vertical movement, either simultaneously or sequentially, relative to fixed lower portion 30. This lengthwise movement of the upper portion is perpendicular to the travel direction of articles along the passline. This downward movement allows the upper surface of the roller, which initially is in the plane of the travel path of the article, to be withdrawn to a retracted position wherein the outer surface of the roller no longer can contact the article.

FIGS. 5 and 8 illustrate a preferred embodiment of the split frames of the invention. FIG. 5 illustrates upper portion 32 including an upper mounting plate 38 and an upper runner 40. FIG. 8 illustrates lower portion 30 including a lower mounting plate 42 and a complementary lower runner 44. The runners extend parallel to the axis of the roller and provide means for the upper portion of the frame to move lengthwise relative to the fixed lower portion. That is, each runner 40 of upper frame 32 sits on top of and can slide along the upper surface of one runner 44 of lower frame 30. The runners also may include means for vertically shifting the upper portion of the frame. Each upper runner 40 includes a riser 46, a base 47 and a running surface 41. Each lower runner 44 includes a riser 48 and a support surface 49. The transition portion of each runner between the riser base and the support/running surface is an incline preferably having a slightly rounded approach. The pitch of the transition portion is indicated by reference numeral 50 and should be an acute angle preferably less than 75° with 60° being most preferred. The end portion of runner 40 away from riser 46 includes a chamfered surface 52 and the end portion of runner 44 away from riser 48 includes a chamfered surface 54. At a pitch greater than about 75°, the force necessary to overcome friction of the chamfered end of the upper runner when sliding up a steeply inclined transition portion may be excessive. This also could cause galling to the surface of the transition portion of the runner by the chamfered surface. The primary purpose of side shield 36 is to protect the runners from becoming dirty or damaged that otherwise might hinder the ease of the runners to shift relative to one another. The side shield also helps to guide the runners so as to keep upper runner 40 aligned with lower runner 44.

FIG. 6 is a bottom view of upper portion 32 illustrating means for locking portion 32 when in the operating position. One embodiment for the locking means includes a block 56 on the chamfered end of the frame and a block 58 on the motor end of the frame. As illustrated in FIG. 7, these blocks are connected to mounting plate 38 such as by welding. Side shields 36 include a base portion 60 which may be welded to plate 38 as well.

FIG. 9 is a plan view of lower portion 30 illustrating additional detail of the means for locking upper portion 32 when in the operating position. Runners 44 of lower portion 30 include a base portion 66 for connecting the runners to lower mounting plate 42. The locking means also includes a block 62 connected to lower portion 30 having an inclined stop surface 92 (FIGS. 11 and 12). The shifting means includes a movable block 72 for cooperating with a threaded operator 74 mounted in a threaded bore in a block 70. Mounting block 70 is rigidly connected to lower plate 42. Movable block 72 includes a key slot 68 for receiving a key 99 (shown in phantom), a slot 75 for receiving the shaft of operator 74 and a slot 76 for receiving a head 78 of operator 74. Movable block 72 is slidably mounted to lower plate 42 by a base 82 having a pair of spaced grooves 84 (FIG. 10). Grooves 84 slidably engage a pair of upstanding slides 86 with each slide having an opposing tongue portion 88 for being received by one of grooves 84. Upstanding slides 86 are connected to lower mounting plate 42 such as welding. Operator 74 illustrated in FIG. 9 is adapted to be manually operated, e.g., by a wrench. It will be understood the operator also could be adapted to be electrically, hydraulically or pneumatically operated as well.

FIGS. 11 and 12 illustrate each of blocks 56, 58, 62 and 72 including an inclined surface having an acute angle, preferably of about 45°. Upper runner 40 and lower runner 44 are shown in phantom. Block 56 is mounted to upper portion 32 and includes an inclined surface 90 that is parallel to inclined stop surface 92 on block 62 mounted to lower portion 30. Block 58 is mounted to upper portion 32 and includes an inclined surface 94 that is parallel to an inclined surface 96 on movable block 72 coupled to lower portion 30. FIG. 11 illustrates the mounting system in the operating position with upper portion 32 locked to lower portion 30. In this operating condition, surface 90 of block 56 is jammed into stop surface 92 of block 62 and base 47 of riser 46 of upper runner 40 is supported by surface 49 of lower runner 44.

Retraction and unlocking of the mounting system now will be described. When it is desired to unlock upper portion 32 from lower portion 30, operator 74 is turned to shift movable block 72 to the right as illustrated in FIG. 12 with its surface 96 disengaging surface 94 of block 58. Simultaneously, surface 90 of block 56 disengages stop surface 92 of block 62. Another stop surface may be connected to upper portion 32 such as by welding a block 100 to the bottom of mounting plate 38. Operator 74 is turned until block 72 engages stop surface 100. Continued turning of operator 74 now causes upper portion 32 to be shifted to the right. After base 47 of riser 46 has moved to the right sufficient distance to clear chambered surface 54, upper portion 32 moves downwardly until running surface 41 of upper runner 40 contacts support surface 49 of lower runner 44. At this point, base 47 of riser 46 has moved vertically below the elevation of support surface 49. This lengthwise, e.g., to the right, and downward movement by upper portion 32 relative to lower portion 30 is indicted by arrows 98. The position shown in FIG. 12 is the retracted or inactive position wherein roller 22 no longer can contact the articles traveling along the upper surface of the roller table.

The vertical height or rise h (FIGS. 5 and 8) of the risers should be sufficient so a defective or inoperative roller does not interfere with continued operation of the processing line when the roller is moved to the retracted position. Accordingly, this riser height should be at least about 5 mm and preferably at least 10 mm. We determined a height of 25 mm performed very well. By having height h a very short distance below the passline of a runout table in a strip mill, a roller being repositioned to the retracted or storage position still permits threading metal strip to a coiler. That is, a metal strip will not drop down into the void created in the runout table when the roller is lowered to the retracted position. For example, the strip can not drop downwardly between rollers 14 and 18 of FIG. 2.

At the time a maintenance person has determined the outer surface of a roller is defective or a drive motor has become inoperative, it may not be convenient to remove the roller or motor from the production line. If so, the maintenance person can retract the upper portion of the split frame, i.e., the roller and the motor, to the inactive or a storage position. The roller and motor may be stored in this retracted position indefinitely without causing defects or damage to the bottom side of articles passing overhead along the roller table. At some future time when maintenance personnel and/or transport equipment become available, upper portion 32 can be completely removed from the roller table for repair or replacement by being withdrawn sidewise or lifted.

After a defective roller has been removed from upper portion 32, a repaired roller can be mounted onto the upper portion in the maintenance shop. The upper frame portion then is transported back to the roller table on the production line and is installed in a reverse manner to that described above. Running surfaces 41 of runners 40 are placed onto support surfaces 49 of runners 44. At this time, it may be desirable to place key 99 into key slot 68 as illustrated in FIG. 13 wherein key 99 is carried by block 72. Operator 74 is turned until one end of key 99 contacts base 47 of one of upper runners 40 and the other end of key 99 contacts base 47 of the other of upper runners 40. Continued turning of operator 74 causes block 72 (and key 99) to shift upper frame portion 32 to the left as viewed in FIG. 12. Finally, surface 96 of block 72 is jammed against surface 94 of block 58 as chamfered surfaces 52 of runners 40 finally engage and climb risers 48 of runners 44. Lengthwise movement of upper frame portion 32 is continued until chamfered surfaces 52 have completely climbed risers 48 (and risers 46 have climbed chamfered surfaces 54) and surface 90 of block 56 engages stop surface 92 of block 62. This is the operating position with the upper frame portion being locked to the lower frame portion.

It will be understood various modifications can be made to the invention without departing from the spirit and scope of it. For example, hydraulic cylinders, pneumatic cylinders or a scissors mechanism could be used to raise and lower the upper frame portion relative to the lower frame portion instead of using risers. The upper frame portion could be bolted to the lower frame portion rather than using stop surfaces. Therefore, the limits of the invention should be determined from the appended claims.

What is claimed is:

1. A roller mounting system for use in a table for conveying articles of manufacture, comprising:

a split frame for supporting a roller defining a generally horizontal path of travel along an upper surface of a roller table, the frame including a lower portion for being connected to a structural member of the roller table, an upper portion adapted for longitudinal and vertical movement relative to the lower portion, means for shifting the upper portion between an operating position and a retracted position and means for locking the upper portion to the lower portion when the upper portion is in the operating position.

2. The mounting system of claim 1 wherein the lower portion includes a pair of spaced runners extending parallel to the axis of the roller for supporting the upper portion.

3. The mounting system of claim 2 wherein each of the runners includes a riser for vertically shifting the upper portion.

4. The mounting system of claim 3 wherein the lower portion includes a mounting plate, the runners connected to an upper surface of the lower mounting plate.

5. The mounting system of claim 1 wherein the upper portion includes a mounting plate.

6. The mounting system claim 1 wherein the lower portion includes a mounting plate and the locking means includes a stop surface on an upper surface of the lower mounting plate.

7. The mounting system of claim 6 wherein the shifting means includes a movable block coupled to the upper surface of the lower mounting plate.

8. The mounting system of claim 7 wherein the upper portion includes a mounting plate and the locking means includes a pair of blocks connected to a lower surface of the upper mounting plate, one of the connected blocks for engaging the stop surface and the other of the connected blocks for engaging the movable block.

9. The mounting system of claim 7 wherein the lower mounting plate includes a pair of upstanding slides connected to the upper surface thereof, each of the slides including a tongue portion, the movable block including a pair of spaced grooves, each of the grooves for receiving one of the tongue portions.

10. The mounting system of claim 2 wherein the upper portion includes a pair of spaced runners extending parallel to the axis of the roller, the lower runners for supporting the upper runners.

11. The mounting system of claim 10 wherein each of the runners includes a riser for vertically shifting the upper portion, the risers of the upper runners being toward one end of the frame and the risers of the lower runners being toward the other end of the frame.

12. The mounting system of claim 3 wherein each runner includes a base and a support surface, a transition portion between the base and the support surface being an inclined surface.

13. The mounting system of claim 12 wherein the inclined surface has an included angle less than 75°.

14. The mounting system of claim 12 wherein each support surface includes a chamfered surface, the angle of the chamfered surface being the same as the angle of the transition portion.

15. The mounting system of claim 1 including a shield on each side of the upper portion.

16. A roller mounting system for use in a table for conveying articles of manufacture, comprising:

a split frame for supporting a roller defining a generally horizontal path of travel along an upper surface of a roller table, the frame including a lower portion for being connected to a structural member of the roller table, an upper portion adapted for longitudinal and vertical movement relative to the lower portion, means for shifting the upper portion between an operating position and a retracted position and means for locking the upper portion to the lower portion when the upper portion is in the operating position, a lower surface of the upper portion and an upper surface of the lower portion each including a pair of spaced runners, the upper runners being supported by the lower runners, each of the runners extending parallel to the axis of the roller and including a riser for vertically shifting the upper portion relative to the lower portion.

17. A roller table for conveying articles of manufacture, comprising:

a split frame including a lower portion and a mounting plate connected to a structural member of the roller table, an upper portion having a mounting plate and adapted for longitudinal and vertical movement relative to the lower portion, means for shifting the upper portion between an operating position and a retracted position and means for locking the upper portion to the lower portion when the upper portion is in the operating position, a roller defining a generally horizontal path of travel along an upper surface of the roller table mounted on an upper surface of the upper portion, a lower surface of the upper portion and an upper surface of the lower portion each including a pair of spaced runners, the upper runners being supported by the lower runners, each of the runners extending parallel to the axis of the roller and including a riser for vertically shifting the upper portion relative to the lower portion, the shifting means including a movable block coupled to the upper surface of the lower mounting plate and the locking means including a stop surface on the upper surface of the lower mounting plate.

18. A roller mounting system for use in a table for conveying articles of manufacture, comprising:

a split frame for supporting a roller defining a generally horizontal path of travel along an upper surface of a roller table, the frame including a lower portion for being connected to a structural member of the roller table, an upper portion adapted for longitudinal and vertical movement relative to the lower portion and means for shifting the upper portion between an operating position and a retracted position, the lower portion including a pair of spaced runners extending parallel to the axis of the roller for supporting the upper portion.

19. A roller mounting system for use in a table for conveying articles of manufacture, comprising:

a split frame for supporting a roller defining a generally horizontal path of travel along an upper surface of a roller table, the frame including a lower portion for being connected to a structural member of the roller table, an upper portion adapted for longitudinal and vertical movement relative to the lower portion and means for shifting the upper portion between an operating position and a retracted position, the upper portion including a shield on each side thereof.

* * * * *